(12) United States Patent
Kirita et al.

(10) Patent No.: US 11,505,249 B2
(45) Date of Patent: Nov. 22, 2022

(54) SUPPORT STRUCTURE FOR VEHICLE COMPONENT

(71) Applicant: Mazda Motor Corporation, Hiroshima (JP)

(72) Inventors: Kohei Kirita, Aki-gun (JP); Shinji Yamauchi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 49 days.

(21) Appl. No.: 17/156,045

(22) Filed: Jan. 22, 2021

(65) Prior Publication Data

US 2021/0237800 A1 Aug. 5, 2021

(30) Foreign Application Priority Data

Feb. 4, 2020 (JP) ............................. JP2020-016906

(51) Int. Cl.
*B62D 21/02* (2006.01)
*B62D 21/11* (2006.01)
*B62D 25/08* (2006.01)

(52) U.S. Cl.
CPC .............. *B62D 21/02* (2013.01); *B62D 21/11* (2013.01); *B62D 25/082* (2013.01)

(58) Field of Classification Search
CPC ........ B60K 11/06; B62D 21/02; B62D 25/20; B62D 21/11; B62D 25/082; B62D 25/08; B62D 21/141
See application file for complete search history.

(56) References Cited

U.S. PATENT DOCUMENTS

| 2005/0127717 | A1* | 6/2005 | Uchida | ................ | B62D 21/152 296/203.02 |
| 2012/0248820 | A1* | 10/2012 | Yasui | ................... | B62D 21/152 296/193.09 |
| 2016/0031484 | A1* | 2/2016 | Nakauchi | ................ | B60R 19/24 296/187.09 |
| 2017/0113533 | A1* | 4/2017 | Abe | ..................... | B60K 5/1241 |

FOREIGN PATENT DOCUMENTS

JP          2019031188 A    2/2019

* cited by examiner

*Primary Examiner* — James A English
*Assistant Examiner* — Matthew James O'Neill
(74) *Attorney, Agent, or Firm* — Alleman Hall Creasman & Tuttle LLP

(57) ABSTRACT

A support structure is provided for a vehicle component disposed inside a power-unit chamber where a powertrain unit of the vehicle is disposed. The support structure includes the power-unit chamber including a side frame extending in a vehicle front-and-rear direction, and a suspension tower housing formed overlapping with a part of the side frame in a plan view seen from above the vehicle. The vehicle component is disposed at a location where the vehicle component overlaps with the side frame in the plan view and forward of the suspension tower housing in the vehicle front-and-rear direction. The vehicle component is supported by one of the side frame, and a support member coupled to an inward side surface of a closed-cross-section member connected to the side frame at a location forward of the suspension tower housing in the vehicle front-and-rear direction.

20 Claims, 10 Drawing Sheets

SUPPORT STRUCTURE FOR VEHICLE COMPONENT

TECHNICAL FIELD

The present disclosure relates to a support structure for disposing a vehicle component, such as a water-cooled condenser and an electric water pump, in a power-unit chamber of a vehicle where a powertrain unit is disposed.

BACKGROUND OF THE DISCLOSURE

JP2019-031188A discloses a vehicle component disposed in a power-unit chamber. According to the structure, the vehicle component is fixed to a side frame extending in a vehicle front-and-rear direction in the power-unit chamber. The fixed position of the vehicle component is forward of a suspension tower housing of the side frame, and on an outward side surface of the side frame in a vehicle width direction. A suspension bracket is used for fixing the vehicle component.

The fixed position of the vehicle component is desirable to be near a skeleton member which constitutes a frame of the vehicle body in consideration of a shake of the vehicle component caused by vibration of the vehicle.

However, some vehicles have the suspension tower housing at a position where it overlaps with a part of the side frame which is the skeleton member in a plan view seen from above the vehicle.

In such a structure, if the vehicle component is fixed above the side frame and forward of the suspension tower housing, it may impede a given deformation of the side frame in an offset collision. That is, although the vehicle component moves rearward according to the side frame which is shortened in the length by the collision, the vehicle component then hits the suspension tower housing, thereby impeding the planned deformation of the side frame. In such a case, a desired impact absorption capability cannot be obtained.

SUMMARY OF THE DISCLOSURE

Therefore, one purpose of the present disclosure is to reduce vibration of a vehicle component while securing an impact absorption capability by a skeleton member in an offset collision.

According to one aspect of the present disclosure, a support structure is provided for a vehicle component disposed inside a power-unit chamber where a powertrain unit of the vehicle is disposed. The support structure includes the power-unit chamber including a side frame extending in a vehicle front-and-rear direction, and a suspension tower housing formed overlapping with a part of the side frame in a plan view seen from above the vehicle. The vehicle component is disposed at a location where the vehicle component overlaps with the side frame in the plan view and forward of the suspension tower housing in the vehicle front-and-rear direction. The vehicle component is supported by one of the side frame, and a support member coupled to an inward side surface of a closed-cross-section member connected to the side frame at a location forward of the suspension tower housing in the vehicle front-and-rear direction.

According to this structure, the side frame or the support member coupled to the closed-cross-section member supports the vehicle component near the side frame as a skeleton member or the closed-cross-section member. Moreover, while the support member moves rearward according to the deformation of the deformed side frame during to an offset collision, it urges the vehicle component supported in a cantilever state to deform inward when the vehicle component hits the suspension tower housing. Thus, the course of the vehicle component is changed inwardly, or passes by the suspension tower housing without colliding with the suspension tower housing from the front.

The vehicle component may be attached to the support structure so that a longitudinal direction of the vehicle component is oriented toward a vehicle up-and-down direction and is inclined in the vehicle front-and-rear direction with respect to the vehicle up-and-down direction.

According to this structure, a contact area of the vehicle component of which the longitudinal direction is oriented toward the vehicle up-and-down direction and is inclined in the vehicle front-and-rear direction, is made to be small as if it point-contacts the suspension tower housing, and the force for deforming the support member can act smoothly.

The closed-cross-section member may be a side member extending from the side frame so as to be inclined upward and forward, and the longitudinal direction of the vehicle component may be parallel to an extending direction of the side member.

According to this structure, since the vehicle component is supported such that the longitudinal direction of the vehicle component is oriented in and parallel to the extending direction of the side member, the vehicle component is supported at a location closer to the side member and with the small influence by the vehicle vibration. Moreover, since the vehicle component is inclined so that the lower end in the longitudinal direction is located rearward of the upper end, the space can be secured between the vehicle component and the suspension tower housing. Therefore, the distance for the vehicle component passing by the suspension tower housing can be fully acquired, and the deformation of the side frame and the displacement of the vehicle component can be ensured.

The vehicle component may be supported by the support member. The support member may have a stepped part configured to protrude a free-end-side part, to which the vehicle component is fixed, inward of a base-end-side part to be fixed to one of the side frame and the closed-cross-section member.

According to this structure, when the load is inputted to the free-end-side part via the vehicle component, the load is concentrated on the stepped part. That is, the stepped part becomes a deformation part so that the deformation of the support member which deflects the vehicle component inwardly can be performed smoothly.

The support member may be comprised of a plate member of which plate surfaces face in a vehicle width direction.

According to this structure, since the support member is comprised of the plate member, and the plate surfaces which are surfaces of the plate member with large areas are oriented in the vehicle width direction to which the deformation is intended, the load can be concentrated effectively compared to a case where the support member is comprised of bar members, and the rearward-moving course of the vehicle component can more smoothly be turned inward.

A guide part may be formed in a surface of the vehicle component on the suspension tower housing side, and the guide part may be inclined inward in the vehicle width direction in the plan view, from the front side to the rear side.

According to this structure, when the vehicle component collides the suspension tower housing, the rearward-moving course of the vehicle component is turned inward by the guide part.

DETAILED DESCRIPTION OF THE DISCLOSURE

Hereinafter, one embodiment for implementing the present disclosure is described with reference to the accompanying drawings.

In a support structure for a vehicle component disposed inside a power-unit chamber where a powertrain unit of a vehicle is disposed, the present disclosure is to reduce vibration of the vehicle component while securing an impact absorption capability by a skeleton member in an offset collision. In this example, a water-cooled condenser which constitutes an air conditioning system is described as the vehicle component.

Figure 1:
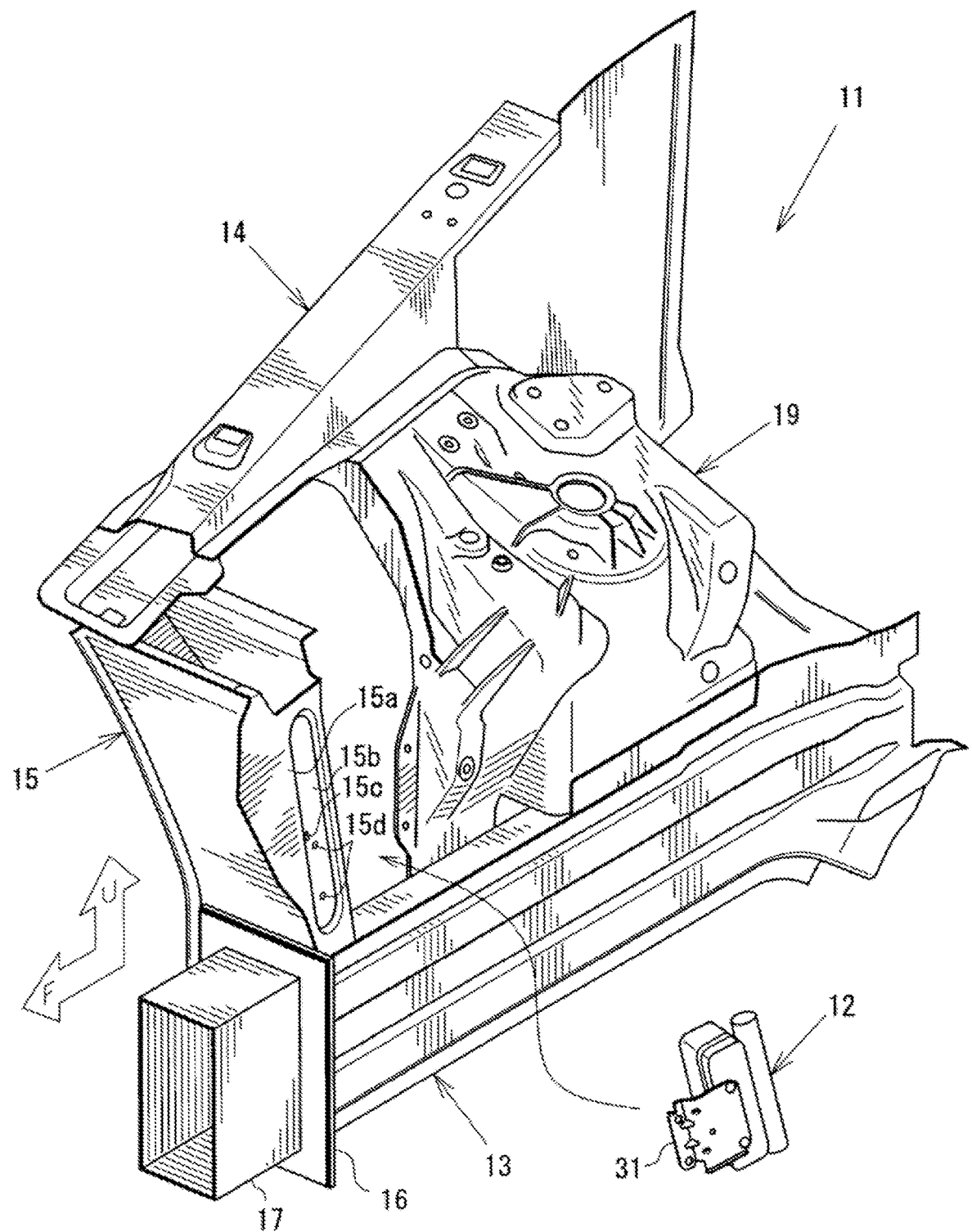
FIG. 1 is a perspective view of a vehicle-body frame which constitutes a power-unit chamber, and a vehicle component.

FIG. 1 illustrates a perspective view of a vehicle-body frame 11 which constitutes the power-unit chamber, and a water-cooled condenser 12 supported by the vehicle-body frame 11. FIG. 1 illustrates only the right side of the vehicle in the vehicle width direction and as illustrated by a white arrow, the lower left in this drawing is front or forward of the vehicle and the up in this drawing is up or upward of the vehicle. "F" of the white arrow means front and "U" means up. Note that the term "outward(ly)" or "outer" or "outside" as used herein refers to outward(ly) in the vehicle width direction with respect to the center line extending in the longitudinal direction of the vehicle, and the term "inward (ly)" or "inner" or "inside" as used herein refers to inward (ly) in the vehicle width direction with respect to the center line.

As illustrated in FIG. 1, the power-unit chamber includes a side frame 13, an apron reinforcement 14, and a side member 15, as skeleton members of a closed cross-section.

The side frame 13 extends in the vehicle front-and-rear direction, and a tip end of the side frame 13 is connected to a crash box 17 through a set plate 16. The crash box 17 is to be crashed by a collision load, and as illustrated by a side view in FIG. 2 and as illustrated by a plan view in FIG. 3, a bumper beam 18 is fixed to a tip end thereof.

Figure 3:
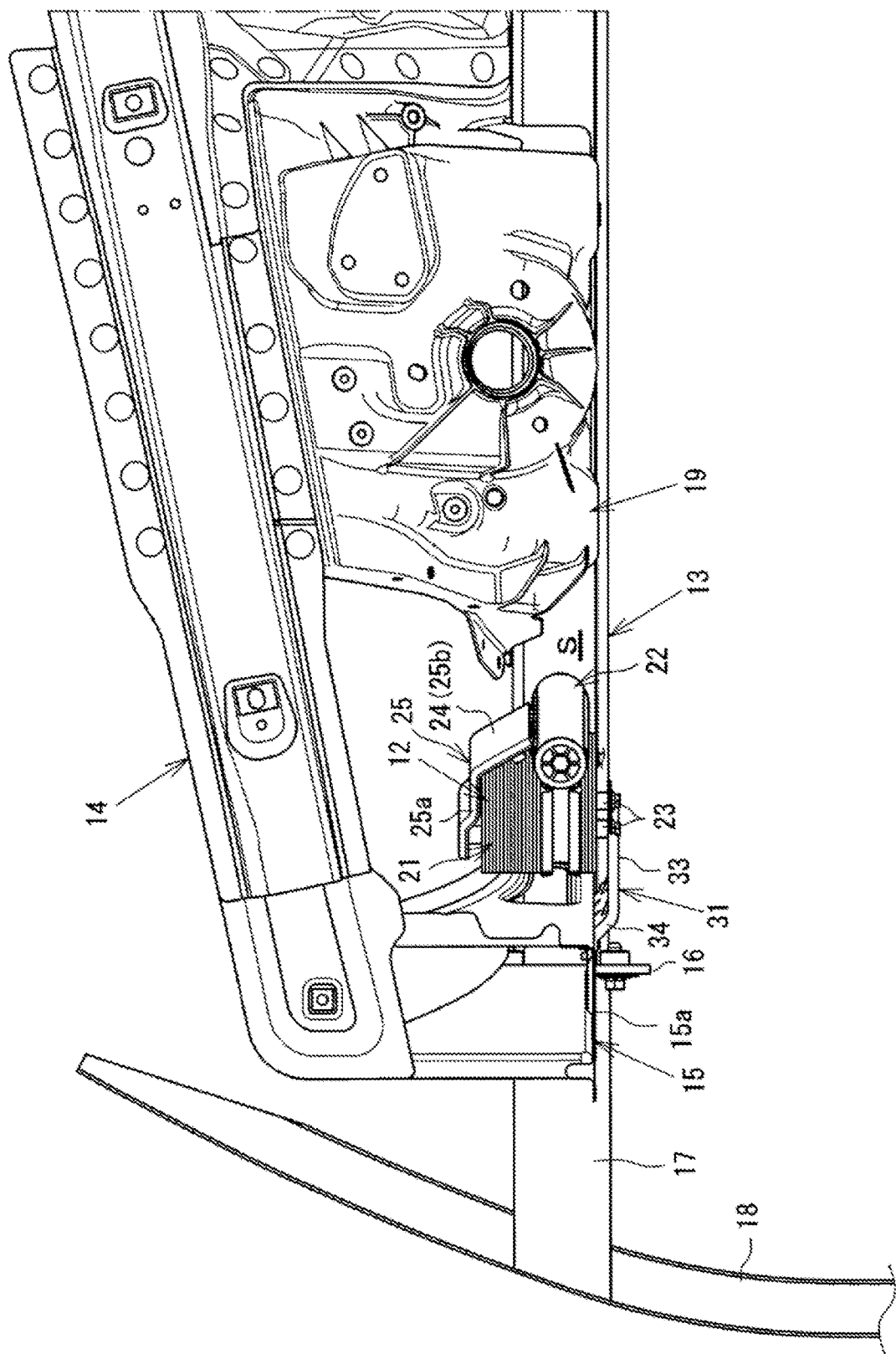
FIG. 3 is a plan view of the substantial part inside the power-unit chamber seen from above the vehicle.

The apron reinforcement 14 extends in the vehicle front-and-rear direction at a location outward in the vehicle width direction of and above the side frame 13. A suspension tower housing 19 is provided between rear parts of the apron reinforcement 14 and the side frame 13. In the plan view seen from above the vehicle, the suspension tower housing 19 overlaps with a part of the side frame 13, as illustrated in FIGS. 1 and 3.

The side member 15 is one example of the closed-cross-section member connected to an upper surface of the side frame 13, at the location forward of the suspension tower housing 19, and it is provided to connect the side frame 13 with the apron reinforcement 14. In detail, the side member 15 extends obliquely upward and forward from the side frame 13 and spreads outward in the vehicle width direction.

A recess 15b having an oval shape in the side view is formed in an inward side surface 15a of the side member 15 in the vehicle width direction. The oval recess 15b inclines upward and forward in the extending direction of the side member 15. The side surface 15a is located above the side frame 13.

Figure 2:
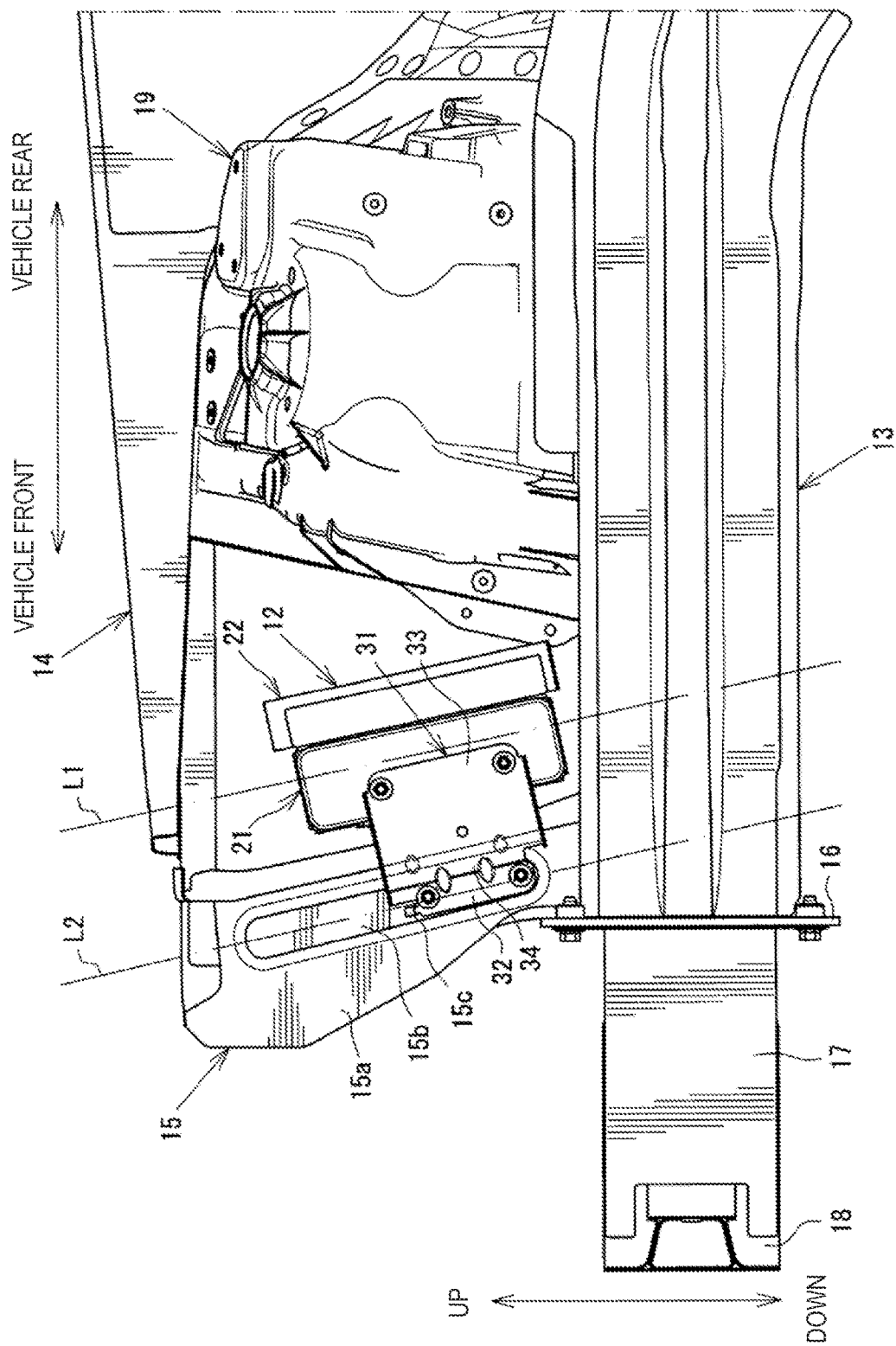
FIG. 2 is a partially cross-sectional side view of a substantial part inside the power-unit chamber seen from inward in the vehicle width direction.

In the power-unit chamber having such a structure, the water-cooled condenser 12 which is the vehicle component is disposed at the location which overlaps with the side frame 13 in the plan view, and forward of the suspension tower housing 19. This position is an inward side surface of the side frame 13, or an inward side surface of the closed-cross-section member connected to the side frame 13 at the location forward of the suspension tower housing 19. In the example of FIGS. 1 to 3, the water-cooled condenser 12 is disposed at the side member 15 which is the closed-cross-section member. Moreover, the water-cooled condenser 12 is supported through a support member 31.

Here, the outline of the water-cooled condenser 12 is described, and the support member 31 is then described.

The water-cooled condenser 12 is to cool refrigerant by using water, and has channels through which the refrigerant and water pass. Since outside air is not needed to cool the refrigerant, it is not necessary to install the water-cooled condenser 12 rearward of an opening for introducing the outside air, formed in a front surface of the vehicle, unlike a radiator (heat exchanger).

Figure 4:
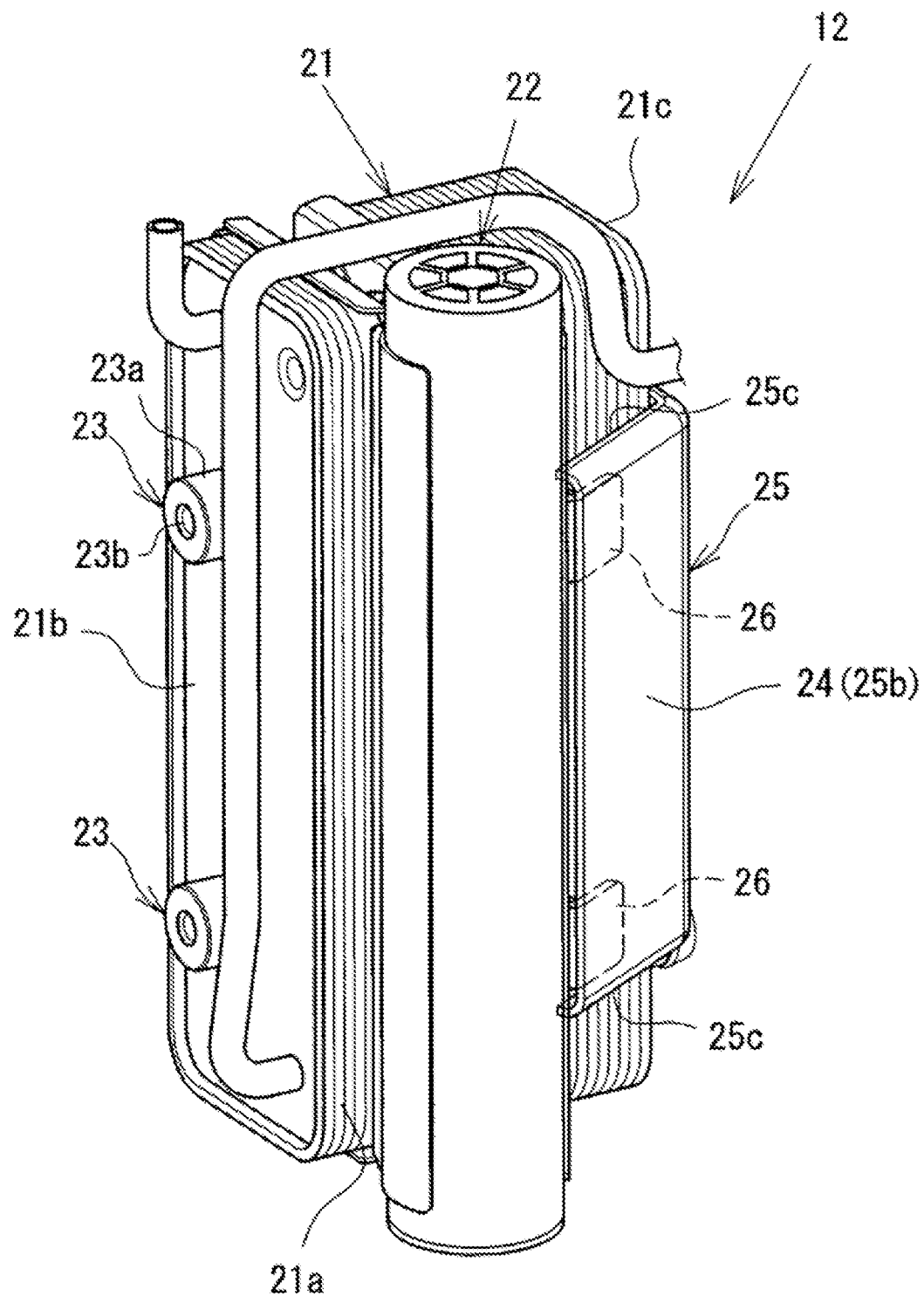
FIG. 4 is a perspective view schematically illustrating the vehicle component.

FIG. 4 schematically illustrates the shape of the water-cooled condenser 12. The water-cooled condenser 12 has a box-shaped part 21 having a substantially rectangular parallelepiped shape, and a cylindrical-shaped part 22 having a circular cylindrical shape. The cylindrical-shaped part 22 is attached to a side surface 21a which forms a rectangular shape of the box-shaped part 21 so that its longitudinal direction is aligned with and parallel to the longitudinal direction of the box-shaped part 21. The box-shaped part 21 has substantially the same longitudinal length as the cylindrical-shaped part 22.

Comparing the width of the side surface 21a to which the cylindrical-shaped part 22 is attached with a diameter of the cylindrical-shaped part 22, the cylindrical-shaped part 22 is narrower than the box-shaped part 21, and therefore, the cylindrical-shaped part 22 is fitted within the width of the side surface 21a of the box-shaped part 21.

When installing the water-cooled condenser 12 having such a shape inside the power-unit chamber, the installed position is in the inward side surface 15a of the side member 15 as described above, but the water-cooled condenser 12 is oriented so that its longitudinal direction is parallel to the vertical direction or the vehicle up-and-down direction. The term "up-and-down direction" as used herein does not only refer to the exact vertical direction. Therefore, it includes a direction inclined to some extent in the vehicle front-and-rear direction and the vehicle width direction relative to the vertical direction but is still generally considered to be the up-and-down direction.

Moreover, the water-cooled condenser 12 is installed so that the narrow cylindrical-shaped part 22 thereof is oriented rearward.

Thus, as illustrated in FIG. 4, support member fixing parts 23 for fixing the support member 31 are formed in an inward side surface 21b among side surfaces adjacent to the side surface 21a holding the cylindrical-shaped part 22, of the box-shaped part 21 of which the longitudinal direction is oriented in the vertical direction.

Although the fixing structure of the support member fixing parts 23 may be any suitable structures, each support member fixing part 23 is comprised of a pillar-shaped projection 23a and a tapped hole 23b in this example. A plurality of support member fixing parts 23 are formed with a spacing therebetween in the longitudinal direction of the side surface 21b, and in this example, two support member fixing parts 23 are formed.

One side surface 21a holding the cylindrical-shaped part 22 (i.e., the surface on the suspension tower housing 19 side of the water-cooled condenser 12 inside the power-unit chamber) is a flat surface opposing to the suspension tower housing 19 when the water-cooled condenser 12 is only comprised of the box-shaped part 21 and the cylindrical-shaped part 22. Since an outer circumferential surface of the cylindrical-shaped part 22 is circular, even if the cylindrical-shaped part 22 moves toward and contacts the suspension tower housing 19, it can change the direction of a load, without receiving the load directly. However, in the case of the flat surface like the side surface 21a of the box-shaped part 21, when it moves toward and contacts the suspension tower housing 19, it may collide the suspension tower housing 19, without changing the direction of the load.

Therefore, a guide part 24 which inclines inwardly from a forward side to a rearward side in a plan view is formed in the surface of the water-cooled condenser 12 on the suspension tower housing 19 side inside the power-unit chamber, close to a side surface 21c at the opposite side of the side surface having the support member fixing parts 23 (outward in the vehicle width direction). In other words, the guide part 24 extends obliquely from the outer circumferential surface of the cylindrical-shaped part 22 to the side surface 21c of the box-shaped part 21, and fills a gap (stepped part) between the side surface 21a of the box-shaped part 21 and the cylindrical-shaped part 22.

The guide part 24 of this example is formed by attaching a guide plate 25. The guide plate 25 is formed by a metal plate, and as illustrated in FIG. 3 which is the plan view, it has a base part 25a fixed in parallel to the side surface 21c which is opposite from the side surface 21b to which the support member 31 is fixed, and an inclined part 25b which inclines to the base part 25a and becomes the guide part 24. The inclined angle of the inclined part 25b to the base part 25a is such an angle that the stepped part formed between the box-shaped part 21 and the cylindrical-shaped part 22 decreases, and the load applied straightly to the guide part 24 can be changed.

Both end edges 25c of the guide plate 25 in the up-and-down-direction are bent inwardly through an arc part from end to end to increase the rigidity.

Such a guide plate 25 is fixed to the outward side surfaces of the box-shaped part 21 and the cylindrical-shaped part 22.

The structure for fixing the guide plate 25 may be any suitable structures including a threaded engagement, such as the support member fixing parts 23 described above. In FIG. 4, metal fittings 26 are for fixing the guide plate 25. They are fixed to the side surface of the cylindrical-shaped part 22 and support the guide part 24 of the guide plate 25 at a given angle.

Figure 5:
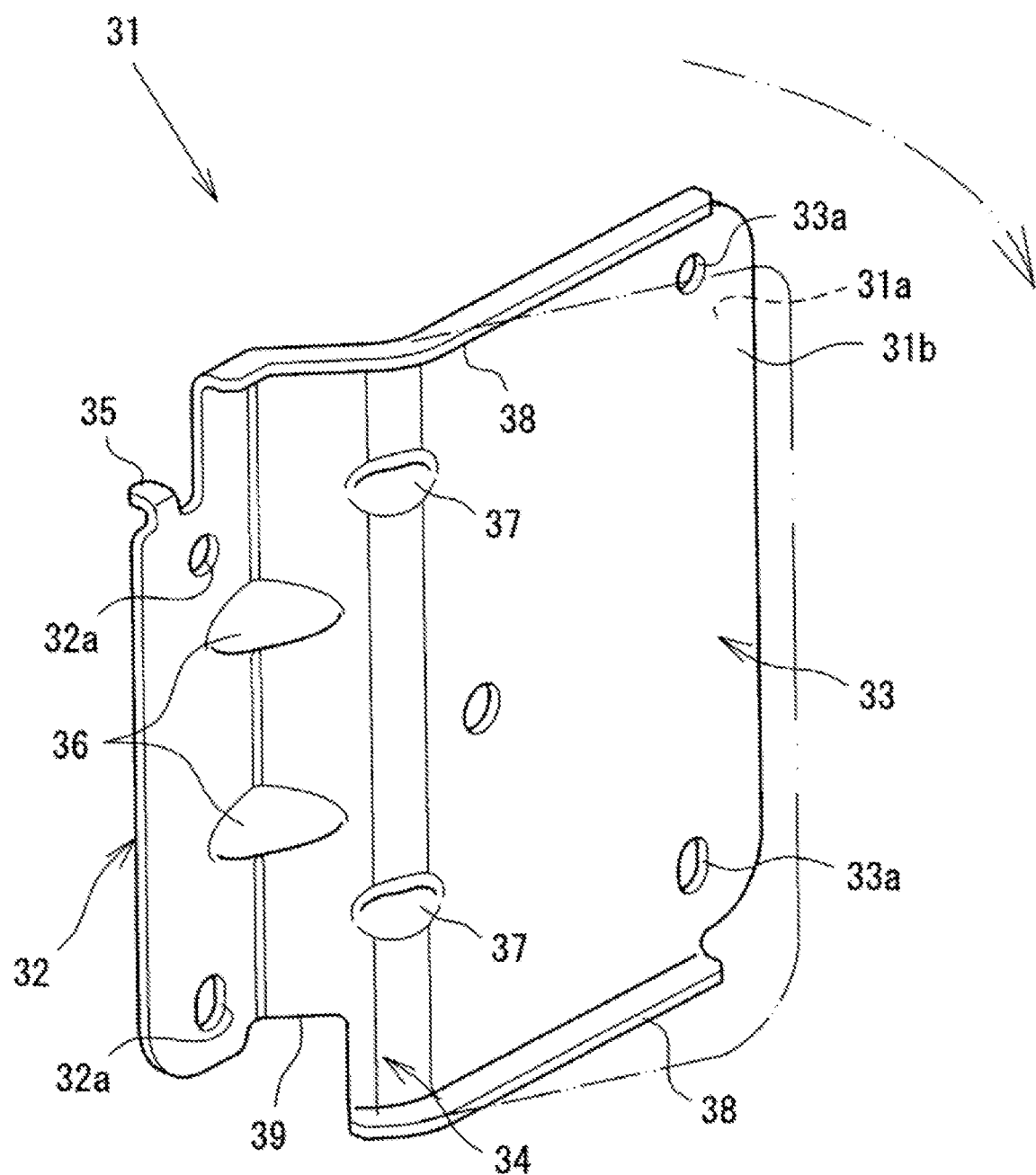
FIG. 5 is a perspective view of a support member.

The support member 31 is comprised of a metal plate member as illustrated in the perspective view of FIG. 5, and it is attached so that plate surfaces (an inner surface 31a, and an outer surface 31b) which are surfaces of the plate member with large areas are oriented in the vehicle width direction (i.e., the plate surfaces face sideways).

This support member 31 includes a base-end-side part 32 to be fixed to the inward side surface 15a of the side member 15, a free-end-side part 33 to which the water-cooled condenser 12 is fixed, and a stepped part 34 which is located between the base-end-side part 32 and the free-end-side part 33, and makes the free-end-side part 33 protrude inwardly of the base-end-side part 32.

The base-end-side part 32 has a substantially rectangular plate shape. In detail, the base-end-side part 32 has the size which can be fitted into the recess 15b formed in the inward side surface 15a of the side member 15, and a plurality of through-holes 32a for fixing the base-end-side part 32 are formed at different vertical locations. The base-end-side part 32 also has a locking pawl 35 for positioning, which is formed at an upper end corner by being bent. The locking pawl 35 protrudes toward the inner surface 31a side.

The free-end-side part 33 has a rectangular plate shape larger than the base-end-side part 32, and is a part to be fixed to the side surface 21b of the box-shaped part 21 of the water-cooled condenser 12 having the support member fixing parts 23. The water-cooled condenser 12 is fixed to the inner surface 31a of the free-end-side part 33. In order to fix the water-cooled condenser 12, through-holes 33a are formed in a tip-end-side edge of the free-end-side part 33, at locations corresponding to the support member fixing parts 23. The position and the size of the free-end-side part 33 relative to the base-end-side part 32 are set so that the water-cooled condenser 12 is supported at a location closer to the side member 15 as much as possible.

The direction connecting between the two through-holes 32a of the base-end-side part 32 is parallel to the direction connecting between the two through-holes 33a of the free-end-side part 33. The term "parallel" as used herein does not only refer to "exactly parallel," but may be include an allowance in which it is normally recognized to be parallel.

The stepped part 34 is formed linearly over the entire vertical dimension, and is located between the base-end-side part 32 and the free-end-side part 33. The stepped part 34 is comprised of a slope which connects obliquely the base-end-side part 32 with the free-end-side part 33. A plurality of convex ribs 36 for reinforcement are press-formed in the outer surface 31b, at a bent part between the stepped part 34 and the base-end-side part 32. Moreover, a plurality of convex ribs 37 for reinforcement are formed in the inner surface 31a, at a bent part between the stepped part 34 and the free-end-side part 33.

Ribs 38 for the reinforcement which stand from the outer surface 31b are formed by bending, in an upper-end edge of the support member 31 from the base-end-side part 32 to the free-end-side part 33, and in a lower-end edge from the stepped part 34 to the free-end-side part 33, respectively.

A notch 39 at a lower end position between the base-end-side part 32 and the stepped part 34 is to permit the support member 31 to be fixed to the recess 15b of the side member 15.

As illustrated in FIG. 1, in a lower part of the recess 15b of the side member 15, a stop hole 15c where the locking pawl 35 hooks, and tapped holes 15d formed at locations in the inclining direction of the side member 15 so as to correspond to the through-holes 32a of the base-end-side part 32.

The support member 31 having such a structure is fixed to the inward side surface 15a of the side member 15 after the water-cooled condenser 12 is fixed to the inner surface 31a of the free-end-side part 33, as illustrated by an arrow in FIG. 1. The fixed position of the support member 31 to the side surface 15a is closer to a lower end of the side surface 15a, which is near the side frame 13.

The water-cooled condenser 12 is fixed through the support member 31, and as illustrated in FIG. 2, the longitudinal direction of the water-cooled condenser 12 is oriented to the vehicle up-and-down direction so that it is inclined in the vehicle front-and-rear direction with respect to the vertical direction (in detail, its lower end is located rearward of its upper end). In FIG. 2, a one-dot chain line L1 indicates the longitudinal direction of the water-cooled condenser 12.

As illustrated by a one-dot chain line L2 in FIG. 2, the side member 15 extends from the side frame 13 so that it inclines upward and forward, and the base-end-side part 32 of the support member 31 is fixed so that it inclines upward and forward in the same way. In addition, since the longitudinal direction of the base-end-side part 32 (the disposed direction of the through-holes 32a) is parallel to the disposed direction of the two through-holes 33a of the free-end-side part 33, the longitudinal direction L1 of the water-cooled condenser 12 is parallel to the inclining direction (extending direction) L2 of the side member 15. The term "parallel" as used herein does not only refer to exactly parallel. Therefore, it includes one being inclined toward the other to some extent but still being generally considered to be parallel.

Moreover, as illustrated in FIG. 3, a space S having a dimension (distance) where the water-cooled condenser 12 can move rearward during a collision is formed between the water-cooled condenser 12 and the suspension tower housing 19 which are aligned in the vehicle front-and-rear direction in a state where the water-cooled condenser 12 is fixed to the side member 15. The rearward-moving distance is a distance which allows the water-cooled condenser 12 to substantially move rearward, when the side frame 13 and the side member 15 receive a load from the collision and are compression-deformed, and the water-cooled condenser 12 begins to be displaced, without the water-cooled condenser 12 contacting the suspension tower housing 19 immediately after that.

According to the above structure, since the water-cooled condenser 12 as the vehicle component is supported closer to the side member 15 through the support member 31 fixed to the side member 15 as the skeleton member, the vibration of the water-cooled condenser 12 can be reduced.

In addition, the support member 31 is fixed to the inward side surface 15a of the side member 15 and supports the water-cooled condenser 12 in a cantilever state. Thus, in an offset collision, since the water-cooled condenser 12 is not caught between the support member 31 and the suspension tower housings 19 but it escapes inward of the suspension tower housing 19, the support member 31 can secure the impact absorption capability by the skeleton member.

Figure 6:
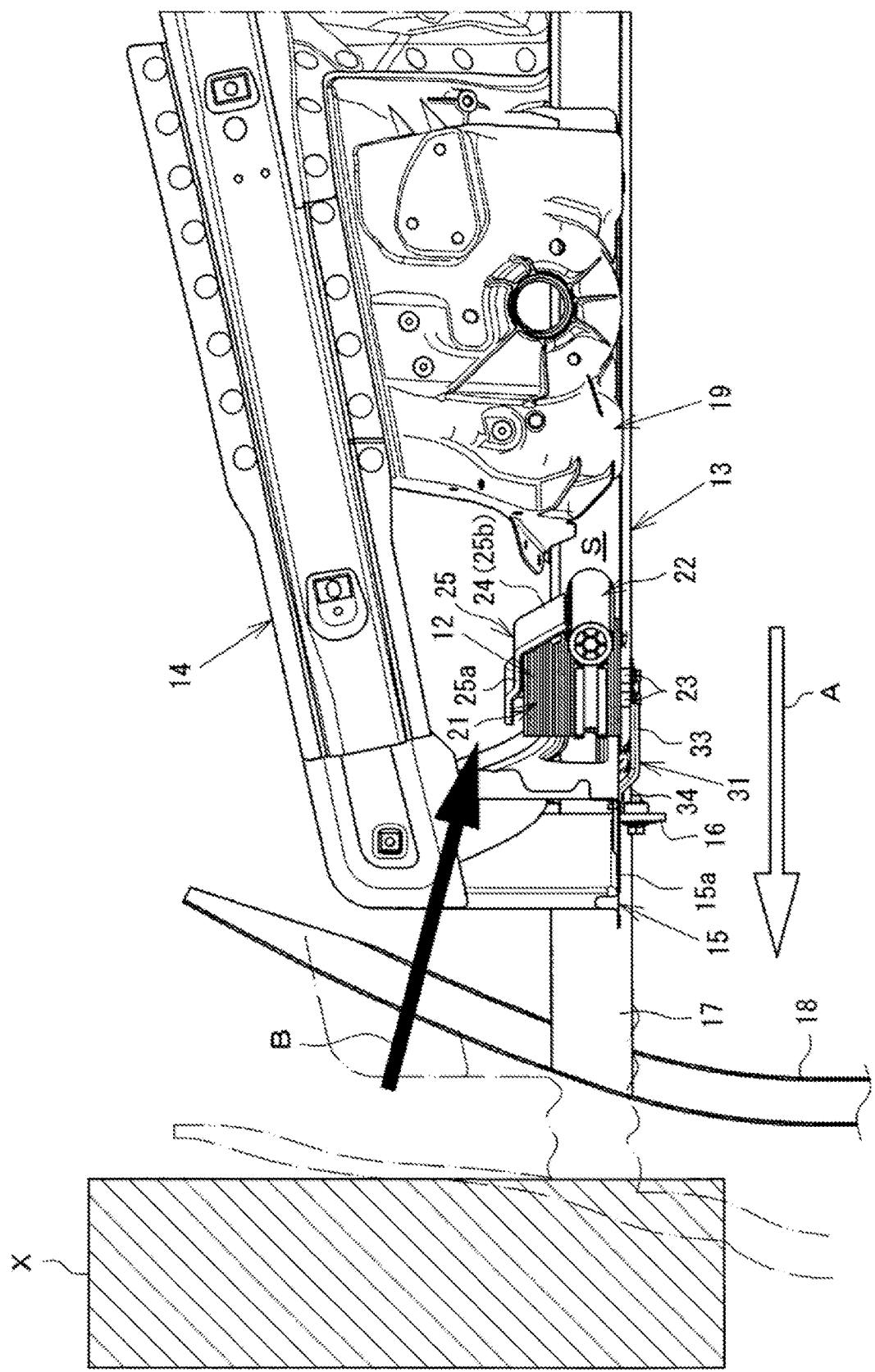
FIG. 6 is a plan view illustrating a behavior in an early phase of a collision.
Figure 7:
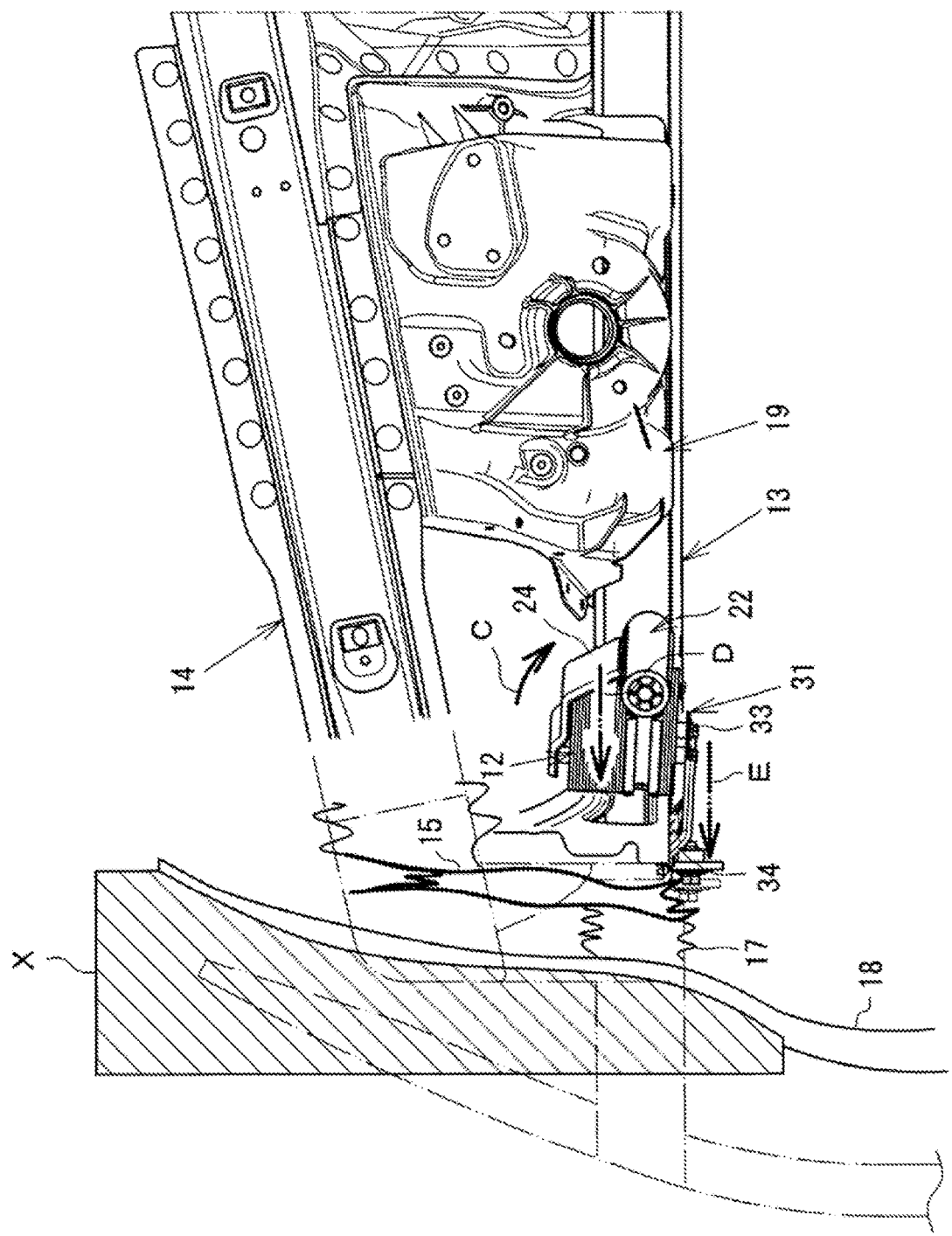
FIG. 7 is a plan view illustrating the behavior in a middle phase of the collision.
Figure 8:
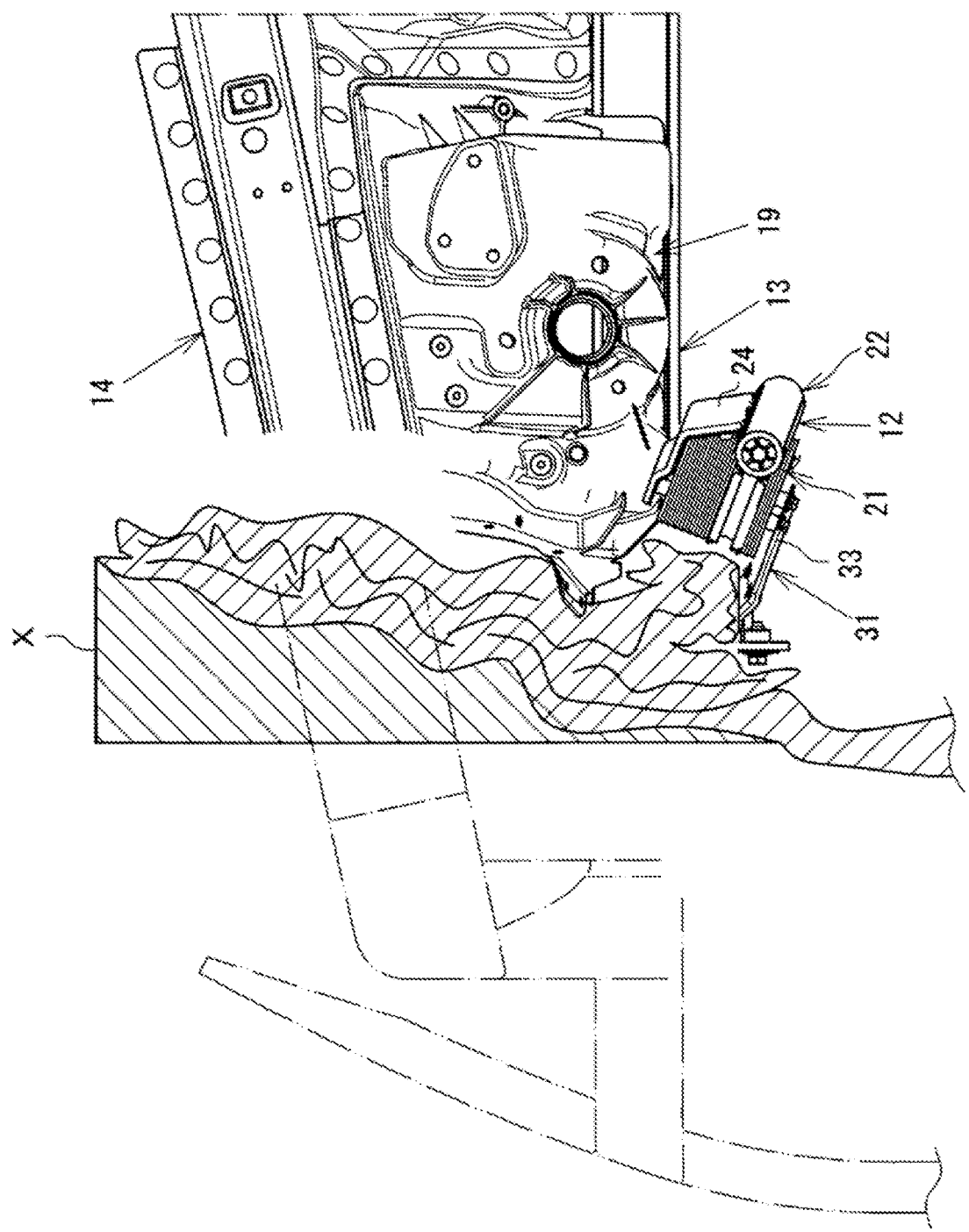
FIG. 8 is a plan view illustrating the behavior in a late phase of the collision.

The behavior during the collision is as illustrated in FIGS. 6 to 8. When the vehicle travels in a direction of a white arrow A and collides a collision object X in an offset collision fashion as illustrated in FIG. 6, the vehicle deforms as illustrated by imaginary lines. At this time, a load as illustrated by a black arrow B is inputted into the vehicle from a slightly obliquely upward direction. In this early phase, the water-cooled condenser 12 is still in an initial state where it is located above the side frame 13 and is oriented straightly rearward.

Then, as the absorption of the inputted load progresses, the bumper beam 18 and the crash box 17 are compression-deformed, as illustrated by solid lines in FIG. 7. Then, when the deformation begins to take place also in the side member 15 and the side frame 13, the water-cooled condenser 12 supported as the cantilever is displaced inwardly by the load from an oblique direction, as illustrated by a thick solid-line arrow C.

Then, by a further compression deformation of the side frame 13, the water-cooled condenser 12 moves rearward and contacts the suspension tower housing 19. The contacted water-cooled condenser 12 receives a reaction force from the suspension tower housing 19, as illustrated by a thick imaginary-line arrow D. This reaction force is also transmitted to the support member 31, as illustrated by a thick imaginary-line arrow E.

When the support member 31 receives the reaction force, it is displaced so that the free-end-side part 33 is opened toward the outer surface 31b, as illustrated by an imaginary-line in FIG. 5. That is, the support member 31 bends at the stepped part 34.

Accordingly, as illustrated in FIG. 8, the water-cooled condenser 12 is further displaced inwardly, without colliding the suspension tower housing 19 from the front and being pinched by the suspension tower housing 19. Therefore, the water-cooled condenser 12 is changed in the course inwardly, or passes by the suspension tower housing 19. As a result, as described above, the impact absorption capability of the side frame 13 can be secured.

Therefore, the impact absorption capability by the skeleton member in an offset collision can be secured, while reducing the vibration of the water-cooled condenser 12.

Particularly, in such a behavior during the collision, since the water-cooled condenser 12 is oriented so that its longitudinal direction is parallel to the vehicle up-and-down direction, and is attached so that it is inclined in the vehicle front-and-rear direction with respect to the vertical direction, a contact area of the water-cooled condenser 12 to the suspension tower housing 19 is small as if it point-contacts the suspension tower housing 19. Therefore, the force for deforming the support member 31 can act smoothly.

Moreover, since the water-cooled condenser 12 is fixed to the side member 15 which extends so as to incline upward and forward, and the longitudinal direction of the water-cooled condenser 12 is parallel to the extending direction of the side member 15, the water-cooled condenser 12 is inclined so that the lower end in the longitudinal direction is located rearward of the upper end. Therefore, the space S can be secured between the water-cooled condenser 12 and the suspension tower housings 19 so that the distance for the water-cooled condenser 12 passing by the suspension tower housing 19 can be fully acquired, and the deformation of the side frame 13 and the displacement of the water-cooled condenser 12 can be ensured.

In addition, since the support member 31 has the stepped part 34 which protrudes the free-end-side part 33, to which the water-cooled condenser 12 is fixed, inward of the base-end-side part 32, the load by the inputted reaction force can be concentrated on the stepped part 34. That is, the stepped part 34 becomes a deformation part so that the deformation of the support member 31 which deflects the water-cooled condenser 12 inwardly can be performed smoothly. Since the stepped part 34 is formed linearly over the full length in the up-and-down direction, its effect is assured.

In addition, since the support member 31 is comprised of the plate member, and it is attached so that the plate surface is oriented to the vehicle width direction, the load can be concentrated effectively. Therefore, the expected deformation is ensured, and the rearward-moving course of the water-cooled condenser 12 can more smoothly be turned inward.

Moreover, since the guide part 24 which is inclined inwardly from forward to rearward in the plan view is formed in the surface of the water-cooled condenser 12 on the suspension tower housing 19 side, the water-cooled condenser 12 having the above-described shape also acquire the desired rearward-moving course after contacting the suspension tower housing 19.

Below, other examples are described. In this description, the same reference characters are assigned to the same parts as the above structure to omit the detailed description.

Figure 9:
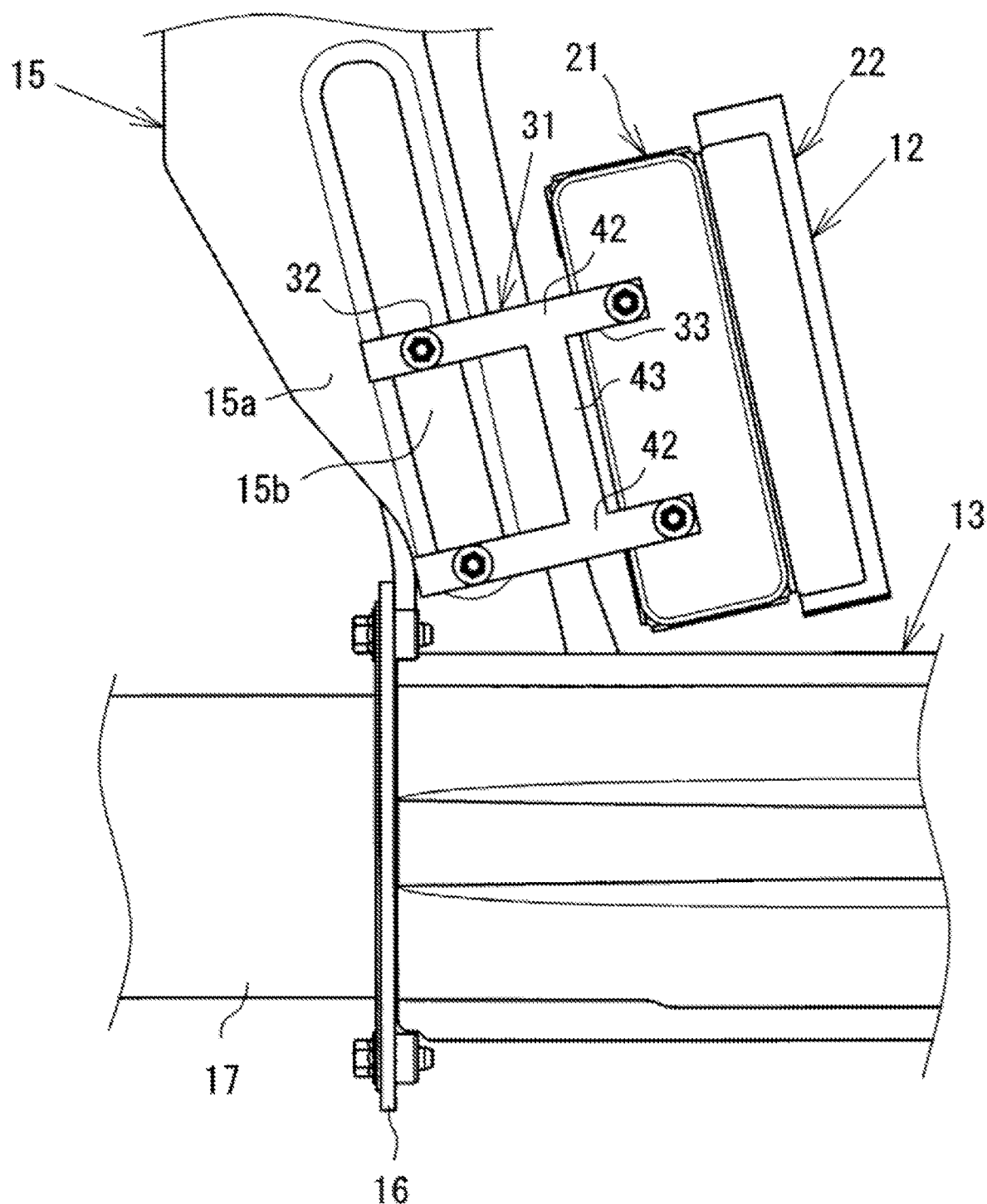
FIG. 9 is a side view of a substantial part using a support member according to another example.

FIG. 9 is a side view illustrating another example of the support member 31, and illustrates a state where it is seen from inward in the vehicle width direction. This support member 31 is comprised of bar members, instead of the plate member described above. For example, the support member 31 has two arm parts 42 which are parts to be fixed, and a coupling part 43 which connects these arm parts 42. Through-holes for fastening with bolts are formed in both ends of each arm part 42. The cross-sectional shape of the bar member may be suitably selected. Two or more coupling parts 43 may be provided.

Here, the side of the arm part 42 fixed to the side member 15 is the base-end-side part 32, and the side fixed to the water-cooled condenser 12 is the free-end-side part 33.

Figure 10:
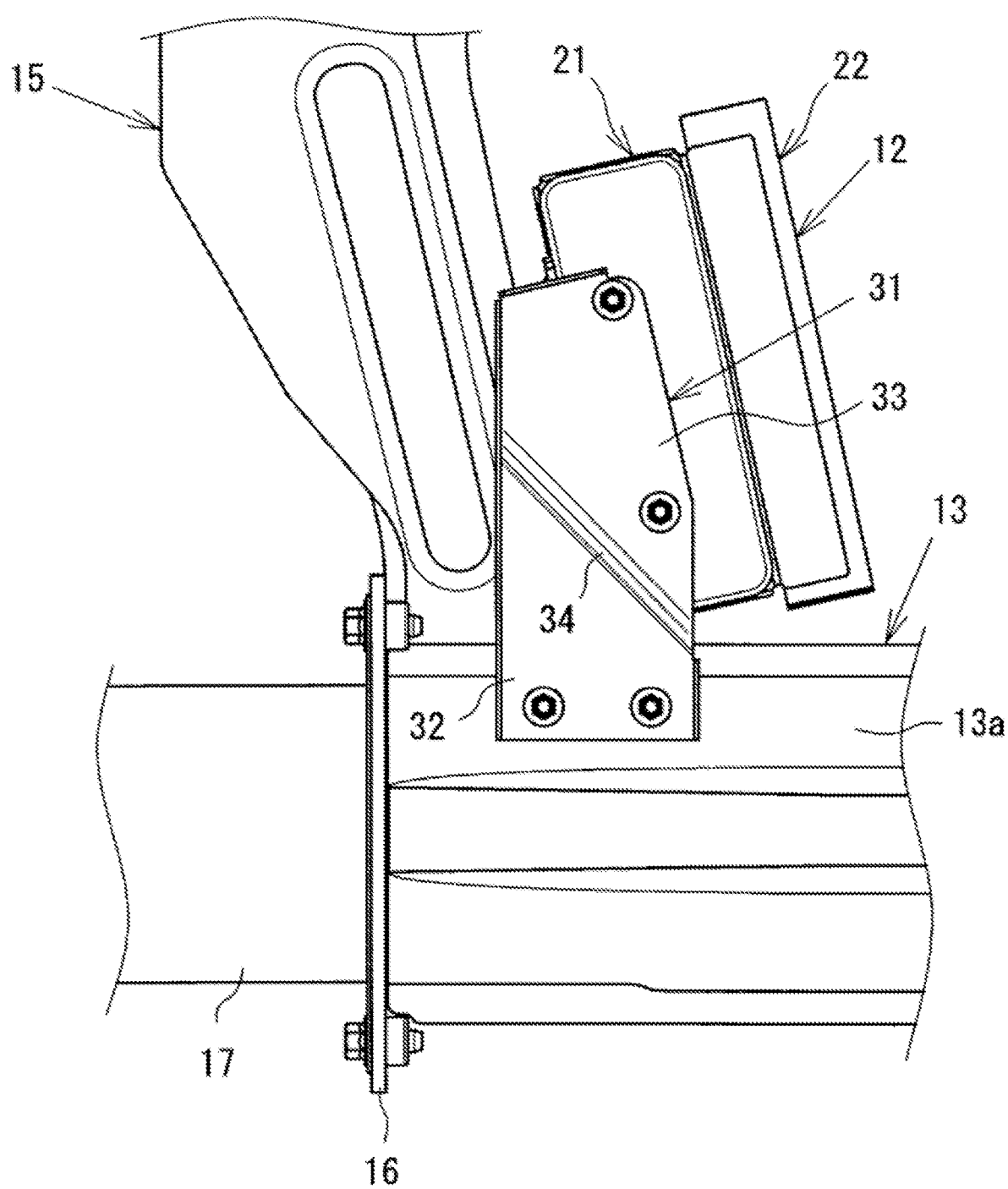
FIG. 10 is a side view of a substantial part illustrating one example in which the vehicle component is supported by the side frame.

FIG. 10 illustrates one example in which the support member 31 is fixed to a skeleton member other than the side member 15 (in detail, the side frame 13). That is, if the support member 31 cannot be fixed to the side member 15 (e.g., there is no side member 15 provided to the vehicle), the support member 31 is fixed to an inward side surface 13a of the side frame 13.

Although the concrete shape of the support member 31 is different, it has fundamentally the same structure as the support member 31 described above. That is, the support member 31 has the base-end-side part 32, the free-end-side part 33, and the stepped part 34. The shape of the support member 31 is selected so that, regardless of the existence of the side member 15, the longitudinal direction of the water-cooled condenser 12 is inclined in the vehicle front-and-rear direction so that the lower end is located rearward of the upper end, as illustrated by the one-dot chain line L1 in FIG. 2. In detail, the entire shape of the support member 31 is a substantially rectangular shape elongated in the up-and-down direction, and the stepped part 34 is formed at an intermediate part in the up-and-down direction so that it inclines upward as it goes forward.

Through-holes for fixing the support member 31 to the inward side surface 13a of the side frame 13 are formed along a lower-end edge of the base-end-side part 32. The disposed direction of these through-holes is parallel to the longitudinal direction of the side frame 13.

Through-holes for fixing the water-cooled condenser 12 are formed along a rearward end part of free-end-side part 33. The disposed direction of the through-holes is parallel to the inclining direction of the water-cooled condenser 12 described above.

The above structures are modes for implementing the present disclosure and the present disclosure is not limited only to the above structures and can adopt other structures.

For example, the vehicle component is not limited only to the water-cooled condenser 12, and may be an electric water pump.

Moreover, when the vehicle component originally has a slope equivalent to the guide part 24, the guide part 24 may be omitted.

The stepped part 34 of the support member 31 may be comprised of a slope which inclines to the base-end-side part 32 and the free-end-side part 33 as described above, or may be formed in a crank shape which is perpendicular to the base-end-side part 32 and the free-end-side part 33.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

12 Water-cooled Condenser
13 Side Frame
13a Side Surface
15 Side Member
15a Side Surface
19 Suspension Tower Housing
24 Guide Part
31 Support Member
32 Base-end-side Part
33 Free-end-side Part
34 Stepped Part

What is claimed is:

1. A support structure for a vehicle component disposed inside a power-unit chamber where a powertrain unit of the vehicle is disposed, the support structure comprising:
the power-unit chamber including a side frame extending in a vehicle front-and-rear direction, and a suspension tower housing formed overlapping with a part of the side frame in a plan view seen from above the vehicle,
wherein the vehicle component is disposed at a location where the vehicle component overlaps with the side frame in the plan view and forward of the suspension tower housing in the vehicle front-and-rear direction,
wherein the vehicle component is supported by a support member coupled to an inward side surface in a vehicle width direction of one of:
the side frame; and
a closed-cross-section member connected to the side frame at a location forward of the suspension tower housing in the vehicle front-and-rear direction, and
wherein the vehicle component is separated from the one of the side frame and the closed-cross-section member via the support member.

2. The support structure of claim 1, wherein the vehicle component is attached to the support structure so that a longitudinal direction of the vehicle component is oriented toward a vehicle up-and-down direction and is inclined in the vehicle front-and-rear direction with respect to the vehicle up-and-down direction.

3. The support structure of claim 1, wherein the closed-cross-section member is a side member extending from the side frame so as to be inclined upward and forward, and the longitudinal direction of the vehicle component is parallel to an extending direction of the side member.

4. The support structure of claim 3,
wherein the support member has a stepped part configured to protrude a free-end-side part, to which the vehicle component is fixed, inward in the vehicle width direction of a base-end-side part to be fixed to one of the side frame and the closed-cross-section member, and
wherein the free-end-side part is fixed to an inward side surface of the vehicle component in the vehicle width direction.

5. The support structure of claim 4, wherein the support member is comprised of a plate member of which plate surfaces face in the vehicle width direction.

6. The support structure of claim 5, wherein a guide plate is fixed to an outer side surface of the vehicle component in the vehicle width direction, and the guide plate includes a guide part inclined inward in the vehicle width direction in the plan view, from the front side to the rear side.

7. The support structure of claim 2, wherein the closed-cross-section member is a side member extending from the side frame so as to be inclined upward and forward, and the longitudinal direction of the vehicle component is parallel to an extending direction of the side member.

8. The support structure of claim 7,
wherein the support member has a stepped part configured to protrude a free-end-side part, to which the vehicle component is fixed, inward in the vehicle width direction of a base-end-side part to be fixed to one of the side frame and the closed-cross-section member, and
wherein the free-end-side part is fixed to an inward side surface of the vehicle component in the vehicle width direction.

9. The support structure of claim 8, wherein the support member is comprised of a plate member of which plate surfaces face in the vehicle width direction.

10. The support structure of claim 9, wherein a guide plate is fixed to an outer side surface of the vehicle component in the vehicle width direction, and the guide plate includes a guide part inclined inward in the vehicle width direction in the plan view, from the front side to the rear side.

11. The support structure of claim 1,
wherein the support member has a stepped part configured to protrude a free-end-side part, to which the vehicle component is fixed, inward in the vehicle width direction of a base-end-side part to be fixed to one of the side frame and the closed-cross-section member, and
wherein the free-end-side part is fixed to an inward side surface of the vehicle component in the vehicle width direction.

12. The support structure of claim 1, wherein the support member is comprised of a plate member of which plate surfaces face in the vehicle width direction.

13. The support structure of claim 1, wherein a guide plate is fixed to an outer side surface of the vehicle component in the vehicle width direction, and the guide plate includes a guide part inclined inward in the vehicle width direction in the plan view, from the front side to the rear side.

14. The support structure of claim 2,
wherein the support member has a stepped part configured to protrude a free-end-side part, to which the vehicle component is fixed, inward in the vehicle width direction of a base-end-side part to be fixed to one of the side frame and the closed-cross-section member, and
wherein the free-end-side part is fixed to an inward side surface of the vehicle component in the vehicle width direction.

15. The support structure of claim 2,
wherein the support member is comprised of a plate member of which plate surfaces face in the vehicle width direction.

16. The support structure of claim 2, wherein a guide plate is fixed to an outer side surface of the vehicle component in the vehicle width direction, and the guide plate includes a guide part inclined inward in the vehicle width direction in the plan view, from the front side to the rear side.

17. The support structure of claim 3,
wherein the support member is comprised of a plate member of which plate surfaces face in a vehicle width direction.

18. The support structure of claim 11, wherein the support member is comprised of a plate member of which plate surfaces face in the vehicle width direction.

19. A support structure for a vehicle component disposed inside a power-unit chamber where a powertrain unit of the vehicle is disposed, the support structure comprising:
the power-unit chamber including a side frame extending in a vehicle front-and-rear direction, and a suspension tower housing formed overlapping with a part of the side frame in a plan view seen from above the vehicle,
wherein the vehicle component is disposed at a location where the vehicle component overlaps with the side frame in the plan view and forward of the suspension tower housing in the vehicle front-and-rear direction,
wherein the vehicle component is supported by a support member coupled to an inward side surface in a vehicle width direction of the side frame, and
wherein the vehicle component is separated from the side frame via the support member.

20. A support structure for a vehicle component disposed inside a power-unit chamber where a powertrain unit of the vehicle is disposed, the support structure comprising:
the power-unit chamber including a side frame extending in a vehicle front-and-rear direction, and a suspension tower housing formed overlapping with a part of the side frame in a plan view seen from above the vehicle,
wherein the vehicle component is disposed at a location where the vehicle component overlaps with the side frame in the plan view and forward of the suspension tower housing in the vehicle front-and-rear direction,
wherein the vehicle component is supported by a support member coupled to an inward side surface in a vehicle width direction of a closed-cross-section member connected to the side frame at a location forward of the suspension tower housing in the vehicle front-and-rear direction, and
wherein the vehicle component is separated from the closed-cross-section member via the support member.

* * * * *